(12) United States Patent
Kindler et al.

(10) Patent No.: US 12,534,676 B2
(45) Date of Patent: Jan. 27, 2026

(54) DEVICE FOR MAKING HYDROGEN FROM HETEROGENOUS WASTE

(71) Applicant: CLEAN ENERGY ENTERPRISES Inc., Long Beach, CA (US)

(72) Inventors: Jean Louis Kindler, Los Angeles, CA (US); William Charneski, Santa Monica, CA (US); Hardk Y. Desai, Surat (IN)

(73) Assignee: CLEAN ENERGY ENTERPRISES Inc., Long Beach, CA (US)

( * ) Notice: Subject to any disclaimer, the term of this patent is extended or adjusted under 35 U.S.C. 154(b) by 602 days.

(21) Appl. No.: 18/114,175

(22) Filed: Feb. 24, 2023

(65) Prior Publication Data
US 2024/0117257 A1    Apr. 11, 2024

Related U.S. Application Data

(60) Provisional application No. 63/414,403, filed on Oct. 7, 2022.

(51) Int. Cl.
  *C10J 3/00*  (2006.01)
  *C10J 3/74*  (2006.01)
  (Continued)

(52) U.S. Cl.
  CPC .................. *C10J 3/007* (2013.01); *C10J 3/74* (2013.01); *C10K 3/006* (2013.01); *C10K 3/04* (2013.01);
  (Continued)

(58) Field of Classification Search
  CPC ........ C10J 2300/0916; C10J 2300/0956; C10J 2300/0976; C10J 2300/0906;
  (Continued)

(56) References Cited

U.S. PATENT DOCUMENTS 4,106,999 A  *  8/1978  Koppelman ............... C10J 3/30
                                                                201/34
11,572,329 B1 *  2/2023  Ahmed ...................... C10J 3/82
  (Continued)

FOREIGN PATENT DOCUMENTS

CN          102260536 B  *  3/2013
CN          116478736 A  *  7/2023  ............... C10J 3/60
  (Continued)

*Primary Examiner* — Imran Akram

(57) ABSTRACT

The invention pertains to a system for extracting hydrogen from an organic feedstock, comprising:
  a thermolyzer supplied with the organic feedstock and adapted to heat it up the feedstock to a temperature of at least 800° C. while conveying it inside a gasification chamber by an auger and to collect a thermogas,
  a duct line to convey the thermogas to a high temperature reformer exposing it to a temperature comprised between 1200° C. and 1,400° C. and releasing a high temperature reformed gas,
  a duct line conveying the high temperature reformed gas to a heat chamber of the thermolyzer, the heat chamber comprising a chamber outlet to release the reformed gas after circulation in the heat chamber,
  a duct line conveying the reformed gas from the chamber outlet to an installation adapted to separate hydrogen from the reformed gas, and
  a hydrogen storage for the hydrogen produced by the installation.

20 Claims, 6 Drawing Sheets

(51) Int. Cl.
*C10K 3/00* (2006.01)
*C10K 3/04* (2006.01)

(52) U.S. Cl.
CPC .. *C10J 2200/158* (2013.01); *C10J 2300/0916* (2013.01); *C10J 2300/0946* (2013.01); *C10J 2300/0976* (2013.01); *C10J 2300/1215* (2013.01); *C10J 2300/1612* (2013.01); *C10J 2300/1637* (2013.01); *C10J 2300/1693* (2013.01); *C10J 2300/1696* (2013.01); *C10J 2300/1823* (2013.01); *C10J 2300/1853* (2013.01); *C10J 2300/1884* (2013.01)

(58) Field of Classification Search
CPC .......... C10J 2300/0946; C10J 2200/158; C10J 2200/36; C10J 2300/1861

See application file for complete search history.

(56) References Cited

U.S. PATENT DOCUMENTS

| | | | |
|---|---|---|---|
| 2005/0095183 A1* | 5/2005 | Rehmat | C10K 3/006 422/600 |
| 2010/0219062 A1* | 9/2010 | Leon Sanchez | C10K 3/001 204/157.43 |
| 2012/0266529 A1* | 10/2012 | Scahill | C10C 5/00 202/84 |
| 2014/0259925 A1* | 9/2014 | Mason | C10J 3/485 48/209 |
| 2020/0041123 A1* | 2/2020 | Santos Fuertes | F23G 5/24 |

FOREIGN PATENT DOCUMENTS

| | | | | |
|---|---|---|---|---|
| EP | 3650518 A1 | * | 5/2020 | ............... C10J 3/46 |
| JP | 2021042284 A | * | 3/2021 | |
| WO | 2021221164 A1 | | 11/2021 | |

* cited by examiner

DEVICE FOR MAKING HYDROGEN FROM HETEROGENOUS WASTE

CROSS REFERENCE APPLICATIONS

The instant application claims priority of U.S. provisional application 63/414,403 filed on Oct. 7, 2022 the content of which is hereby included by reference in its entirety.

TECHNICAL FIELD

The invention pertains to the field of gasification, more specifically, the invention pertains to the production of syngas and hydrogen by the pyrolysis of waste like municipal solid waste comprising or not a biomass.

In all the text, hydrogen means di-hydrogen (H2) unless specified differently.

Unless specified differently, the term "organic" when associated to a matter or a product shall be construed as related to organic chemistry in a broad sense, i.e., to a product or a matter comprising compounds containing carbon in covalent bonding.

BACKGROUND ART

Hydrogen may be used as an energy vector e.g. in a fuel cell to make electricity and to power a motor of an electrical vehicle or any electrical appliance without emitting greenhouse gas (GHG) such as $CO_2$.

However, at the date of filing of the instant patent application, 96% of hydrogen is made by reforming natural gas, a fossil fuel, without carbon capture, leading to the emission, in the atmosphere, of about 9 times the weight of the produced hydrogen in the form of GHG.

So-called green hydrogen may be produced by the electrolysis of water. However, the yield is very low, about 35%, when comparing the electrical energy used to perform the electrolysis to the electricity released by the fuel cell, and becomes even less effective considering the energy required for compression if the hydrogen has to be moved and compressed to e.g. 700 bars (10,290 Psi).

Biomass gasifiers are also used to extract hydrogen from various forms of biomass such as sewage sludge.

According to that process, a pyrolysis gas is produced by pyrolyzing a biomass and is further reformed to make a syngas, a gaseous mixture of CO, $H_2O$, $CO_2$, $CH_4$ and $H_2$, from which hydrogen may be selectively extracted, for instance by a Pressure Swing Absorption (PSA) process.

Gasification can be thought of as a partial combustion process where steam reacts with the carbon contained in a solid carbonaceous fuel or feedstock.

This reaction occurs at a high temperature, e.g. 800° C. to 1,000° C. (1,472° F. to 1,832° F.). It is an endothermic reaction, meaning that heat is consumed by the reaction and a source of heat is required to support it.

In a conventional gasifier, such heat is for instance generated by providing just enough air or pure oxygen to achieve the desired gasification temperature, by combustion of a fraction of the feedstock, in order to sustain the gasification reaction. This is referred to as Partial Oxidation process.

Although the combustion of biomass emits GHG, these GHGs are not fossils and are recaptured by a biomass in a short cycle. Yet such combustion actually burns fuel/feedstock and consequently a trade-off has to be found between the desired gasification temperature and the amount of feedstock that is consumed to generate the required heat.

Thus, Partial Oxidation "consumes" part of the feedstock and, as such, reduces the potential for hydrogen production from that feedstock.

According to another embodiment of the prior art, the feedstock is heated through a heat carrier like a solid medium such as sand or ceramic beads.

Such a method is disclosed in document WO 2021/221164. The heat carrier medium is heated in a preheating installation then brought in contact hot with a feedstock made of a biomass thus pyrolyzing it by heat exchange.

A pyrolysis gas reformer partially burns a fraction of the gas generated by the pyrolysis through the supply of oxygen or air. In order to control the combustion and the temperature, the reformer implementing this method comprises 2 valves, a first valve controls a continuous supply of air or oxygen and a second valve provides an intermittent supply of air or oxygen to the reformer.

Although, such a device is effective in extracting hydrogen from a biomass feedstock, its efficiency in terms of energy consumption, notably because of the energy required to preheat the heat carrier, as well as in terms of investment, requiring costly equipment like a system for feeding, collecting, char separation and heating of the heat carrier as well as a complex valve system.

Another system of the prior art uses a plasma at about 4,000° C. in temperature to gasify the feedstock. Such a solution, in addition to be investments intensive also requires high maintenance costs because of the reactor internal walls being subjected to fairly high temperatures.

SUMMARY OF INVENTION

The invention aims at solving the shortcomings of the prior art and to this end pertains to a system for extracting hydrogen from a chemically organic feedstock, comprising:
  an organic waste feeder unit,
  a screw thermolyzer comprising a first end and a second end, supplied with the organic feedstock at a feedstock inlet at the first end and adapted to heat up the organic feedstock to a temperature of at least 800° C. while conveying the organic feedstock inside a gasification chamber by an auger from the first end to a solid residues outlet at the second end, and to collect a thermogas at a thermogas collector,
  a first duct line to convey the thermogas from the thermogas collector to a thermogas inlet of a high temperature reformer, the high temperature reformer exposing the thermogas to a temperature comprised between 1,200° C. and 1,400° C. and releasing a reformed gas at high temperature though a reformed gas outlet,
  a second duct line conveying the reformed gas from the reformed gas outlet to a reformed gas inlet of a heat chamber of the screw thermolyzer, the heat chamber being comprised between an enclosure of the gasification chamber and an outside enclosure of the screw thermolyzer and comprising a chamber outlet to release the reformed gas after circulation in the heat chamber from the reformed gas inlet to the chamber outlet,
  a third duct line conveying the reformed gas from the chamber outlet to an installation adapted to separate hydrogen from the reformed gas, and
  a hydrogen storage for the hydrogen produced by the installation.

Thus, the system does not use a solid heat carrier in direct contact with the feedstock nor Partial Oxidation but uses the heat of reformed gas produced by a high temperature reformer to indirectly heat the organic feedstock in the screw thermolyzer, thus avoiding all the installations required for heating, circulating and cleaning the solid heat carrier medium of the prior art also avoiding wasting hydrogen precursors via oxidation. The auger conveying the organic feedstock in the thermolyzer enables a fine control of the flow of organic feedstock through the thermolyzer, a perfect mixing of the organic feedstock and an improved heat exchange with the walls of the gasification chamber, heated by the heat chamber. Therefore, the heat of the reformed gas, which needs to be cooled down anyway before undergoing hydrogen separation, is recouped in the thermolyzer, further enabling to heat the organic feedstock to a temperature as high as 800° C. and over, thus improving the conversion of the organic feedstock into a gas mixture with little solid residues.

The invention is implemented according to the advantageous embodiments disclosed hereafter, those being considered individually or according to any technically operable combination.

Advantageously, the system further comprises a char conveyor for conveying chars collected at the solid residues outlet of the screw thermolyzer to a char inlet of the high temperature reformer. Thus, reformed gas may further be extracted at high temperature from the remaining carbonaceous solid residues, if any, further improving the yield.

In an embodiment, the screw thermolyzer comprises 2 parallel augers conveying the organic feedstock in opposite directions from the first end to the second end. This embodiment allows a more compacted design of the screw thermolyzer, increases the heat transfer from the heat chamber to the organic feedstock within the gasification chamber, improves the mixing of the organic feedstock and further allows a better control of the organic feedstock flow rate across the thermolyzer.

In an embodiment the screw thermolyzer comprises a steam injection inlet for injecting steam into the gasification chamber. Because of the high temperature reached in the thermolyzer, higher than 800° C., steam reacts with the carbon in the organic feedstock thus further increasing the hydrogen yield.

Advantageously, the installation adapted to separate hydrogen from the reformed gas comprises a carbon capture and sequestration unit. Thus, the production of hydrogen with the system of the invention is at least carbon neutral and even carbon-negative.

In a preferred embodiment, the carbon capture and sequestration unit comprises a mineralization of carbon dioxide in a brine solution and comprises a production of carbonates ($CO_3^{-2}$). This embodiment makes the installation carbon-negative.

Advantageously, the high temperature reformer comprises an oxy-fuel burner to raise the temperature of the thermogas into the high temperature reformer.

Advantageously, the oxy-fuel burner is supplied with an off-gas issued from the installation adapted to separate hydrogen from the reformed gas.

According to a first embodiment, the installation adapted to separate hydrogen from the reformed gas comprises the production of N5 pure hydrogen ($H_2$) and an off-gas comprising, in volume, at least 60% of carbon monoxide (CO) and at least 15% hydrogen.

According to a preferred embodiment, in the hydrogen separation unit, the reformed gas is directed to a CO conversion Water Gas Shift Reactor to make a WGSR processed gas. The WGSR processed gas is free from carbon monoxide and further increases the hydrogen fraction in the WGSR outlet.

According to a first variant, the WGSR processed gas is directed to a Vacuum Pressure Swing Absorption CO2 separator, before entering a Pressure Swing Absorption device, and the off-gas supplying the oxy-fuel burner is hydrogen. This embodiment provides a zero emission although self sustainable high temperature reformer.

According to a second variant, the WGSR processed gas is directed to a membrane reactor for hydrogen separation and the WGSR processed gas is heated through heat exchange with reformed gas issued from the high temperature reformer before entering the membrane reactor.

According to an embodiment, the first duct line comprises an expansion reactor between the thermogas collector and the thermogas inlet.

The expansion reactor comprises a reactor steam inlet adapted to inject steam in the thermogas in the expansion reactor.

Advantageously, the expansion reactor comprises a mixing chamber configured to promote mixing of the thermogas with steam by a turbulent flow through the mixing chamber.

The reformed gas is cooled in a gas conditioning unit before entering the installation adapted to separate hydrogen from the reformed gas, and wherein such cooling is performed with water through a heat exchanger.

The water flowing through the heat exchanger exchanges heat with the reformed gas to generate steam.

Advantageously, the steam is injected into the gasification chamber as well as in the expansion reactor and the WGSR when present.

Advantageously, the system further comprises a boiler with a burner to further raise a temperature of the water flowing through the heat exchanger and the burner is supplied with reformed gas.

BRIEF DESCRIPTION OF DRAWINGS

The invention is disclosed hereafter according to its preferred embodiments, in no way limiting, and with reference to FIG. 1 to FIG. 6, wherein.

DESCRIPTION OF EMBODIMENTS

Figure 1:
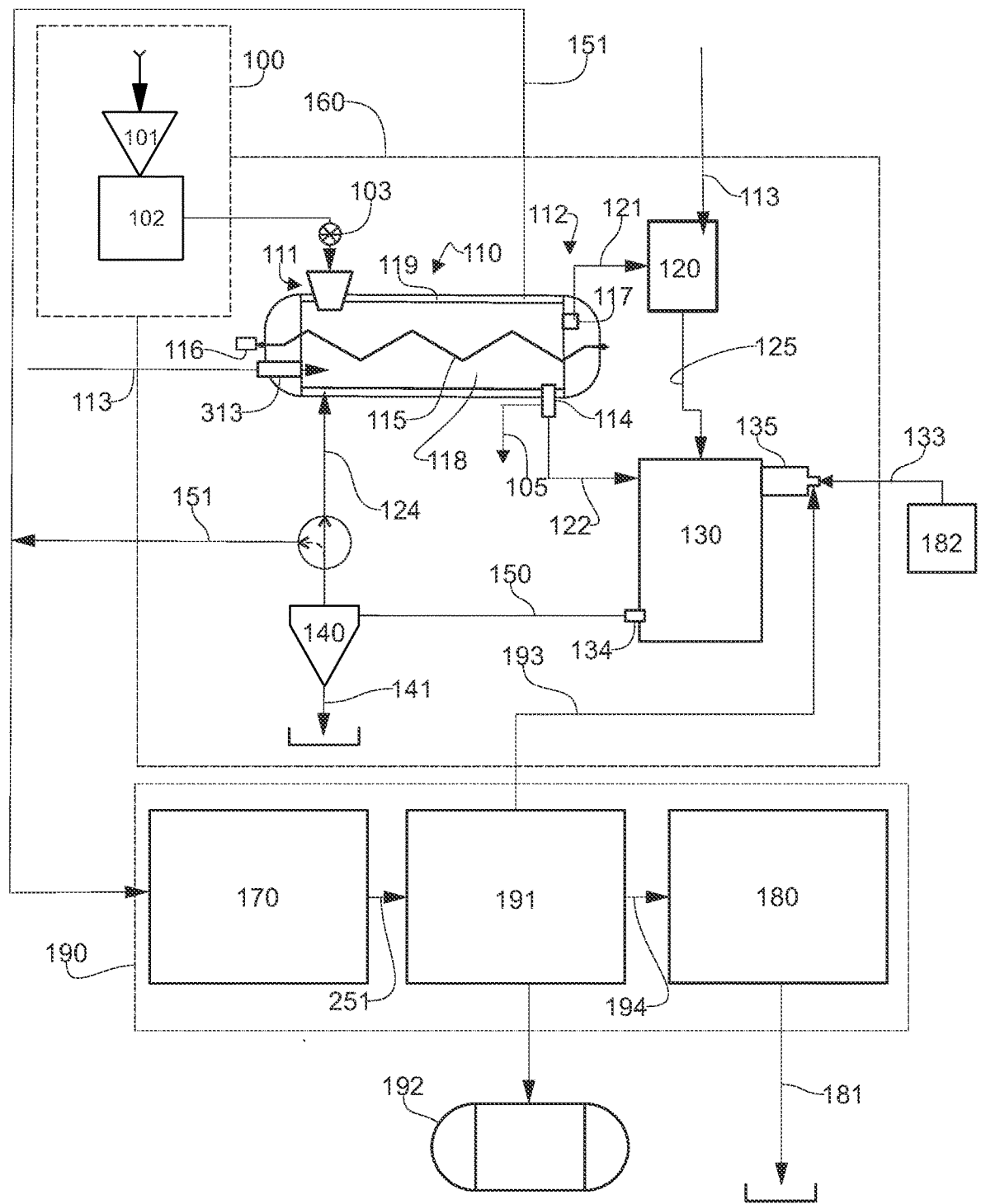
FIG. 1 is a diagrammatic representation of the system of the invention.

FIG. 1 according to an exemplary embodiment, the system of the invention comprises an organic waste feeder unit (100) comprising a hopper (102) and a hopper loader (101) for loading an organic feedstock into the system.

The organic feedstock consists of discarded materials or waste made of organic compounds comprising fixed carbon.

The system is very flexible and accepts feedstock further comprising an ash content preferably kept below 5%, although it may accept an ash content reaching up to 30%. The moisture content of the feedstock may range from 5% to 30% but should preferably be around 15%.

As nonlimiting examples, the feedstock consists in a plant-based biomass, for example, wooden chips, wooded sawdust, construction waste wood, pruned branches, forest residues, unused trees, agricultural crops residues such as discarded vegetables and fruits, rice straw, wheat straw, rice husk, marine plants, algae, fishery residues, biological biomass, for example, livestock waste, sewage sludge, manure, organic municipal solid waste such as garbage comprising cardboard, plastics and food waste, and any combination thereof.

For the system to work in acceptable conditions, a preparation of the feedstock is performed whether on site or in a remote waste collecting plant or both.

Basically, and more specifically when the feedstock contains municipal waste, it is sorted in order to sort out nonorganic material such as metal, glass or cement from it, the feedstock is then shredded after sorting. The moisture content may be adjusted by mixing feedstocks of different origins, such as a low moisture content feedstock with a high moisture content feedstock.

This preparation allows to keep the ash and the moisture content of the feedstock in appropriate ranges for the performance of the system.

The organic feedstock is fed into a gasification and reforming installation (160), first into a screw thermolyzer (110) through a feedstock inlet comprising a rotary air lock (103).

According to an exemplary and diagrammatic embodiment, the screw thermolyzer comprises an auger (115) spun by a drive (116) inside a gasification chamber (118). The auger drives the organic feedstock from a first end (111) to a second end (112) of the thermolyzer at a controlled rate.

The screw thermolyzer further comprises a heat chamber (119) separated from a gasification chamber (118) by a wall. The heat chamber heats up the internal wall of the gasification chamber (118), the temperature of the organic feedstock raises as the feedstock travels from the first end (111) to the second end (112) of the thermolyzer and contacting the internal wall of the gasification chamber (118).

The temperature of the organic feedstock raises from room temperature at the exit of the feeder unit (100) to 800° C. (1,472° F.) and even up to 900° C. (1,652° F.) in the gasification chamber (118), preferably around 850° C. (1,562° F.).

According to an embodiment, the screw thermolyzer (110) comprises a steam injection inlet (313) adapted to inject steam from a steam line (113) into the gasification chamber (118), though steam is preferably injected in an expansion reactor (120) at the exit of the screw thermolyzer.

Steam/water comes from the moisture contained in the organic feedstock and from the steam injected into gasification chamber (118) through the steam injection inlet (313) from the steam line (113). Therefore, the amount of injected steam into the gasification chamber depends on the nature of the organic feedstock and on its moisture content.

A thermogas comprising mainly CO, $H_2O$, $CO_2$, $CH_4$ and $H_2$ as a result of the gasification process, and various other gases in low quantities, exists the thermolyzer (110) through a thermogas collector (117) and his conveyed by a duct line (121, 125) to a high temperature reformer (130).

According to a preferred embodiment a first duct line (121) ducting the thermogas from a chamber outlet of the screw thermolyzer (110) to the high temperature reformer (130) comprises a gas expansion reactor (120) where the thermogas is further mixed with steam from the steam line (113), and the steam enriched thermogas is conveyed to the high temperature reformer (130) by a second duct line (125).

At the second end (112), the screw thermolyzer (110) comprises a solid residues outlet (114) where the solid residues of the thermolized feedstock are collected as ashes and chars. In an embodiment, chars are conveyed by a char conveyor (122) to a char inlet of the high temperature reformer (130). Ashes (105) are collected and disposed off-site.

In the high temperature reformer, the thermogas is exposed to a temperature of at least 1,200° C. (2,192° F.) and preferably up to 1,400° C. (2,552° F.).

Such a high temperature is reached by the heat provided by an oxy-fuel burner (135). The burner is supplied with oxygen from an oxygen line (133) and with an off-gas (193) released at the hydrogen separation unit (190). The oxygen line (133) is fed through an oxygen producing device (182), producing oxygen from air e.g. by cryogenic separation.

According to a first embodiment, the off-gas comprises 60% of CO and at least 15% of $H_2$.

Figure 5:
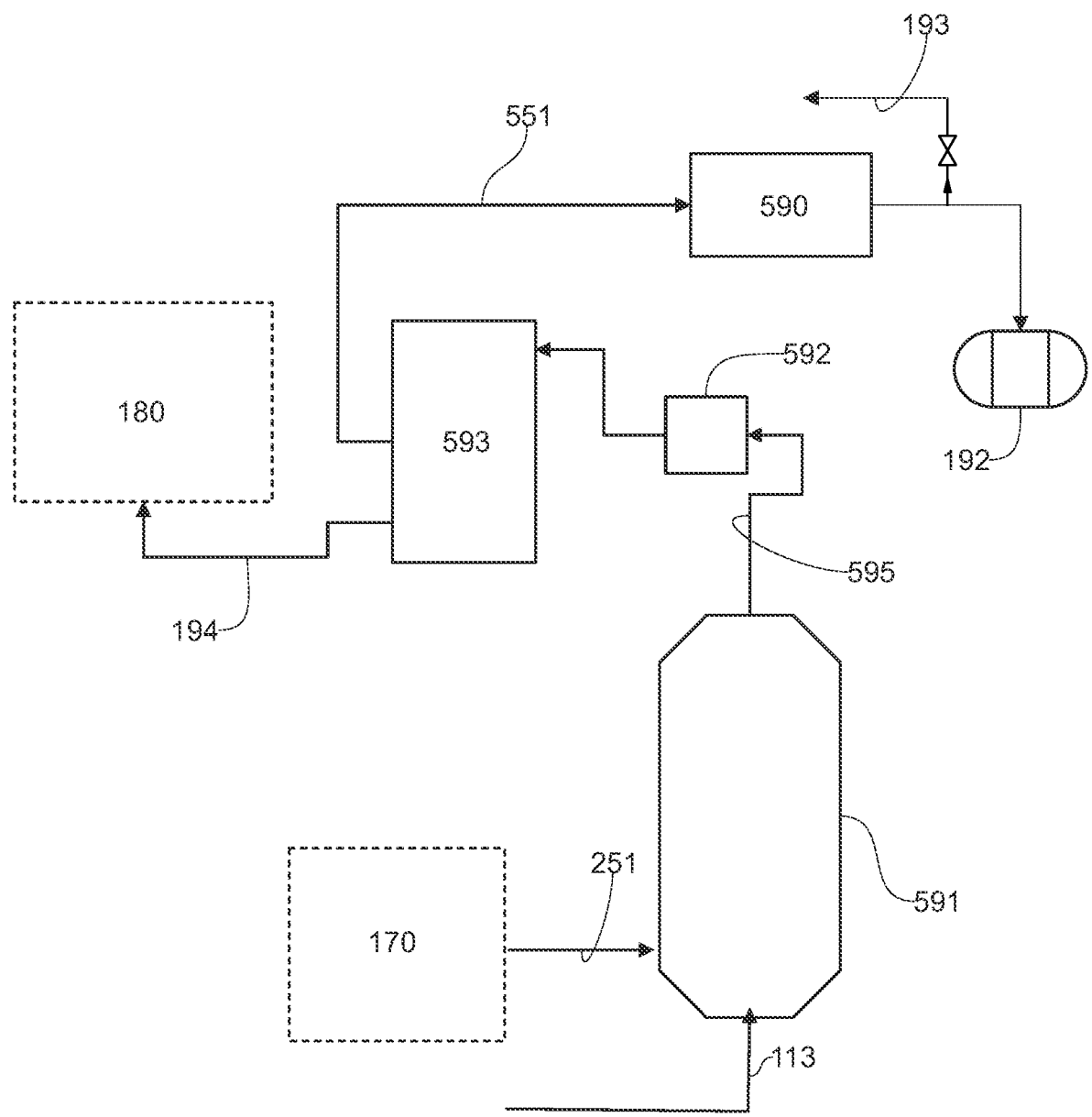
FIG. 5 is a scheme of the hydrogen separation unit.

According to a preferred embodiment in reference to FIG. 5 the so-called off-gas is $H_2$ collected at the exit of the hydrogen separation unit.

Whatever the embodiment, during the combustion of the off-gas (193) in the oxy-fuel burner (135) there is no contact with air, thus reducing or even avoiding NOx emissions, and, when according to the preferred embodiment the off-gas is hydrogen, the combustion is clean producing mainly steam that further promotes downstream recovery of hydrogen while avoiding increase of unwanted carbon compounds in the reformed gas.

The high temperature reformer (130) produces a gas called a raw reformed gas, rich in free $H_2$ and at high temperature.

The raw reformed gas (150) at high temperature leaves the high temperature reformer (130) through a reform gas outlet (134) and is conveyed, first, to a particle separator (140) to remove remaining ashes from the gas stream and then, at least part of this clean reformed gas is sent for circulation into the heat chamber (119) of the screw thermolyzer by a heating duct line (124) through a reformed gas inlet. Therefore, the heat of the reformed gas is used to raise the temperature of the feedstock.

Ashes (141) separated from the raw reformed gas are retrieved and disposed.

The following reactions occur in the gasification reforming installation:
  partial oxidation of char carbon with oxygen available from the organic feedstock: $C+O_2 \rightarrow CO_2$
  steam gasification: $C+H_2O \rightarrow CO+H_2$
  Methanation: $C+2H_2 \rightarrow CH_4$
  Boudouard reactions: $C+CO_2 \rightarrow 2CO$
  Water-gas shift reactions: $CO+H_2O \rightarrow CO_2+H_2$
  Methane reforming reactions: $CH_4+H_2O \rightarrow CO+3H_2$
  Acid formation: $H_2+Cl_2 \rightarrow 2HCl$ and $H_2+S \rightarrow H_2S$ The clean reformed gas exists the heat chamber of the screw thermolyzer by a chamber outlet, and is directed to the reformed gas conditioning unit (170).

Figure 2:
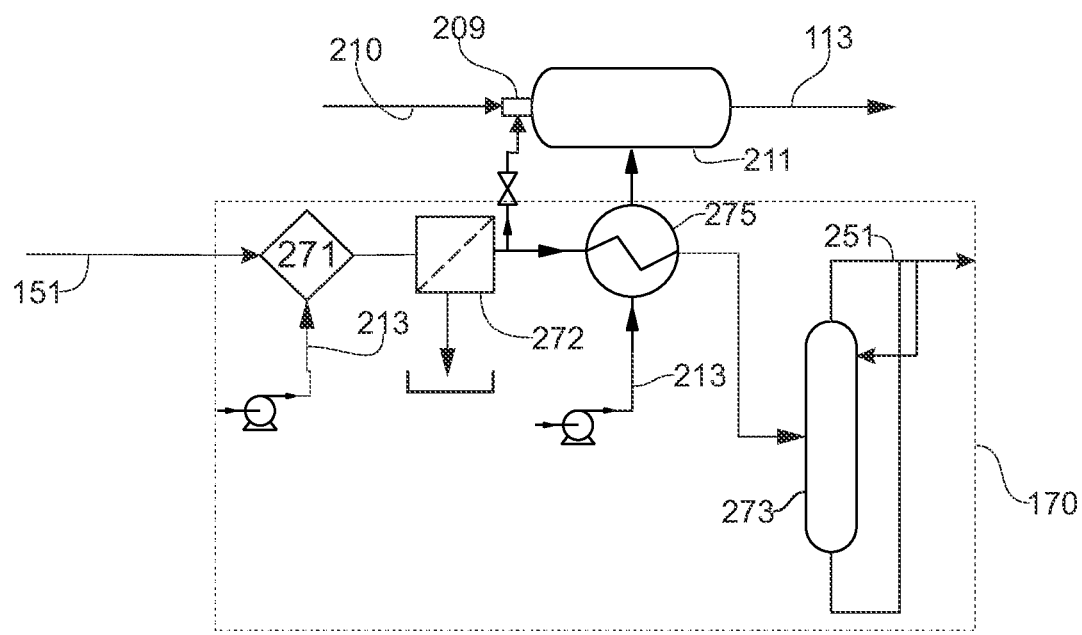
FIG. 2 shows a diagrammatic representation of a gas conditioning unit between the thermolyzing-reforming unit and the hydrogen separation unit.

Before entering the hydrogen separation installation the reformed gas is preferably cooled and further treated for contaminants as shown in FIG. 2 to give a conditioned reformed gas.

As an exemplary embodiment, hydrogen separation from the conditioned reformed gas is performed through a hydrogen separation unit (191) comprising a Pressure Swing Absorption (PSA) device associated with a carbon capture and sequestration unit (180).

The person skilled in the art understands that using a PSA unit for separating hydrogen from the reformed gas is just an exemplary embodiment and that other methods of separation may be contemplated such as membrane separation or cryogenic separation without changing the principle of the invention.

The reformed gas shall be cleaned and cooled before entering the hydrogen separation unit. To this end the clean reformed gas that has been partially cleaned through the particle separator and is partly cooled by passing through the heat chamber (119) of the screw thermolyzer (110) where is exchanges heat with the organic feedstock.

The hydrogen produced by the hydrogen separation unit, is stored in a storage (192), for instant in a pressurized tank with a pressure comprised between 300 bars and 700 bars, so as to reduce the storage volume, or according to variants may also be liquefied, or stored in a dry adsorption media such as metal hydrides.

The carbon capture and sequestration unit (180) processes carbon dioxide and stores carbon in carbonates (181).

As an exemplary embodiment the carbon capture and sequestration unit (180) is of the kind distributed by CAPTICO2® a company set in Norway, Solheimsgaten 16, 5058 Bergen, wherein the carbon dioxide is mineralized in a brine solution. After drying it can be disposed, e.g. buried, or sold for specific uses.

FIG. 2 the partly cooled and cleaned reformed gas (151) is brought to the gas conditioning unit (170) by the third duct line and is first directed to a quenching unit (271) supplied with water (213) in order to lower its temperature.

According to an embodiment the clean reformed gas goes through a filter (272) and a scrubber (273).

The filter (272) allows the removal of fine ashes from the reformed gas which are collected and disposed.

The scrubbing allows to clean the gas from hydrogen chloride, hydrogen sulfide and other corrosive elements.

The clean reformed gas is preferably further cooled before entering the scrubber. To this end, before entering the scrubber, the clean reformed gas is cooled by passing through a heat exchanger (275) supplied with a stream of water (213). In the heat exchanger the water turns to steam that is further supplied to the steam consuming devices of the installation such as in the reformer, the expansion reactor and the screw thermolyzer through the steam line (113).

At the start up of the installation the flow of reformed gas may not be high enough to produce enough steam through the heat exchanger (275). To this end the installation further comprises a boiler (211) comprising a boiler burner (209).

The boiler burner (209) may be supplied with cleaned reformed gas or with a LPG through a LPG line (210), the latter configuration being used for the start up of the installation.

The reformed gas conditioning unit (170) releases a conditioned reformed gas (251) that is directed to the hydrogen separation unit.

According to an exemplary embodiment (not shown) the system is comprised, ready for assembly, in a plurality of 20 feet ISO containers, that may be superimposed and connected.

All the components are positioned and fixed in each container, said container have sufficient rigidity to support all the components and their own weight.

Therefore, installing the system consists mainly in connecting the piping and the containers, the containers making the structural frame of the installation, they can lay on site on a concrete slab or on a steel rafter.

For this purpose, the components are designed as compact as possible.

Figure 3A:
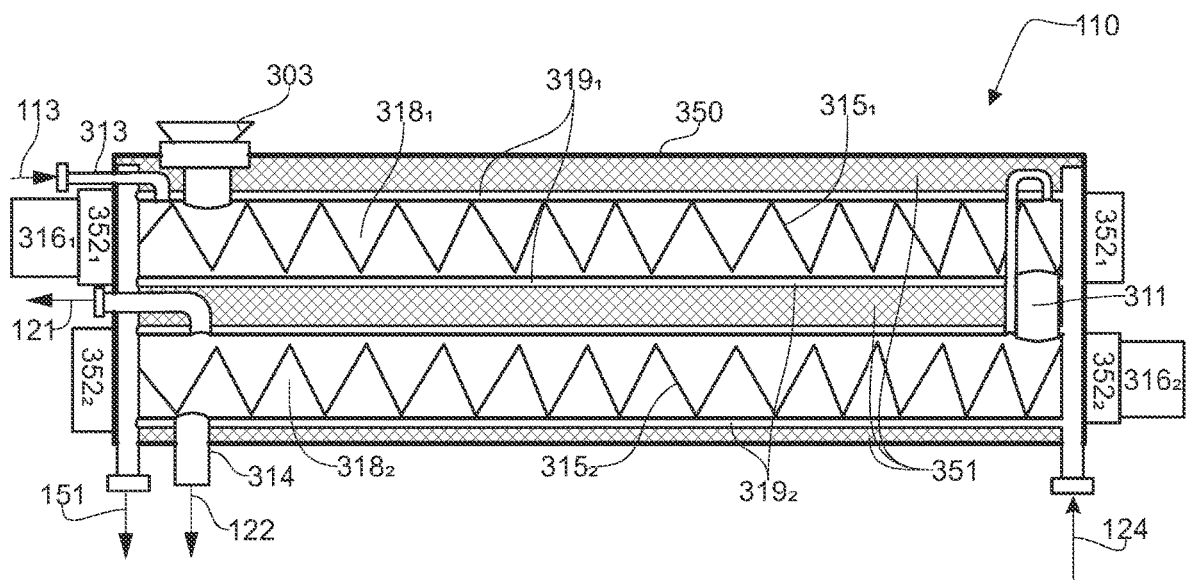
FIG. 3A is a simplified view in longitudinal cross section of an exemplary embodiment of a screw thermolyzer.

FIG. 3A according to an embodiment the thermolysis unit is comprised in a container on top of a container comprising the reforming unit.

According to such an embodiment the screw thermolyzer (110) is basically of a tubular shape, set horizontally, comprising a first end and a second end, and means to convey a feedstock introduced at the first to the second end.

As an exemplary embodiment, the screw thermolyzer (110) comprises two parallel augers ($315_1$, $315_2$), as means for conveying the feedstock, each auger being comprised between two bearings ($351_1$, $351_2$) the augers being driven by 2 electric drives ($316_1$, $316_2$). The screw thermolyzer (110) offers the advantage over, e.g. a rotary kiln, that the bearings and the corresponding sealings are outside the high temperature zone, that the bearings can cooled without any effect on the operation of the device, therefore reducing costs and that the lip seals which could leak reformed gas to the atmosphere are eliminated.

The two augers ($315_1$, $315_2$) are driving the feedstock in opposite directions over a total travel length that is roughly double the overall length of the thermolyzer (110), therefore making it more compact.

Each of the augers ($315_1$, $315_2$) may have a single or multiple thread with a constant or a variable pitch over its length, the two augers may have different pitches and different pitch variation, one or both of the augers may be conical.

Each auger spins inside a gasification chamber ($318_1$, $318_2$) the two gasification chambers being connected together through a connection channel (322), so that the feedstock is fed in the screw thermolyzer (110) by a feeding hopper (303) in the first gasification chamber at a first end, the feeding end, is then driven toward an opposite end of the first gasification chamber by the first auger, when it falls into the second gasification chamber through the connection channel (311) in a first end of the second gasification chamber ($318_2$), and is then driven to an opposite end of the second gasification chamber, the collecting end, by the second auger ($315_2$).

In this exemplary embodiment the gasification chambers are cylindrical with a circular cross section, yet the cross section of the gasification chambers may be e.g. elliptical and one or both the gasification chambers may extend over a conical shape in order to cooperate with the shape, sections, threads, pitches and pitch variations of the augers. As an exemplary implementation, the walls of the gasification chambers are heated by sets of tubular ducts ($319_1$, $319_2$) set around each gasification chamber and conveying a high temperature reformed gas.

The tubular ducts as well as the walls of the gasification chamber are, for instance, made of ceramics, like aluminum nitride, or made of a high temperature resistant nickel-based alloy coated with a thigh thermal conductivity ceramic such as aluminum nitride, beryllium oxide, silicon carbide or silicon nitride, to resisting abrasion and withstanding the high temperatures.

The screw thermolyzer comprises an external (350) enclosure and thermal insulation layers (351) between the gasification chambers and this enclosure as well as between the gasification chambers.

The screw thermolyzer as well as the whole thermolyzing-reforming unit works under atmospheric pressure or under a light negative pressure, therefore, they do not require oversized thicknesses to withstand high pressures.

A steam inlet (313) enables to inject steam from the steam line (113) into the first gasification chamber (318$_1$), if needed depending on the moisture content of the feedstock.

As the feedstock, driven by the augers, travels from the feeding end to the disposal end, the organic feedstock, mixed with steam if applicable, gasifies according to the chemical reactions given above and, on one hand, turns to a solid residue, i.e. char and ashes, collected at the collecting end through one or more solid residues outlets (314), and on another hand, to a gas, called a thermogas which is basically a syngas, collected by a thermogas outlet (321).

The system produces a low quantity of chars which are collected at the solid residues outlet (314) and, in an advantageous embodiment, are further directed to the high temperature reformer by a char conveyor. Ashes are disposed off-site. Alternatively, chars may also be disposed off-site.

The thermogas is collected in both gasification chambers through a pipe work and directed to an expansion reactor (120) where it is mixed with steam before being conveyed to the high temperature reformer.

The screw thermolizer being set horizontally, thermogas is collected on top of the screw thermolyzer while solid residues are collected on the bottom of the thermolyzer, the feedstock traveling along a horizontal axis.

Figure 3B:
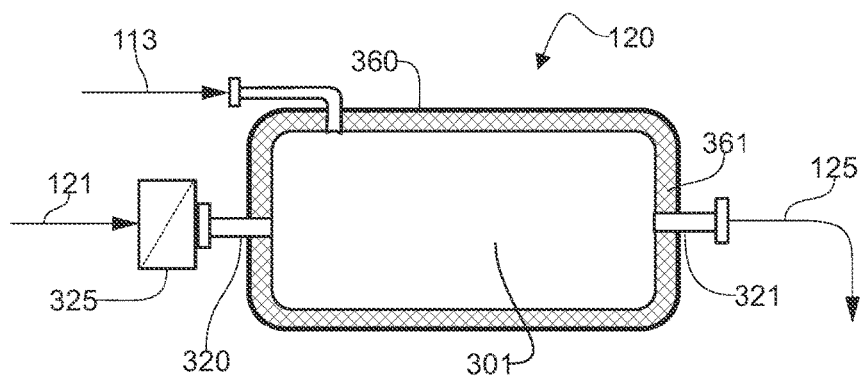
FIG. 3B is a simplified view in longitudinal cross section of an embodiment of the expansion.

FIG. 3B the expansion reactor (120) is preferably located beside and attached to the screw thermolyzer making therefore a compact installation.

The expansion reactor comprises an external shell (360) with a thermal insulation (361) the inner wall being made of ceramic or coated with ceramic.

The thermogas leaving the screw thermolyzer enters the expansion reactor (120) preferably through a particle filter (325) at a thermogas inlet (320).

The expansion reactor enables to keep the pressure in the overall installation to a level close to the atmospheric pressure beside the thermal expansion of the gasses and allows to inject steam into the thermogas released by the thermolyzer. Steam is injected from the steam line (113) through a Venturi effect.

The expansion reactor comprises a mixing chamber (301) wherein the injection of steam promotes turbulences in the thermogas stream and enhances the mixing of steam and thermogas as well as reactions. The steam also provides an additional hydrogen source to the thermogas while the expansion reactor provides the residence time and space for the gaseous reactions to take place.

The thermogas escapes the expansion reactor by a thermogas outlet (321) and is directed to the high temperature reformer.

When the system is set in stacked containers, the container comprising the high temperature reformer is set underneath the container comprising the screw thermolyzer and the expansion reactor.

Figure 4:
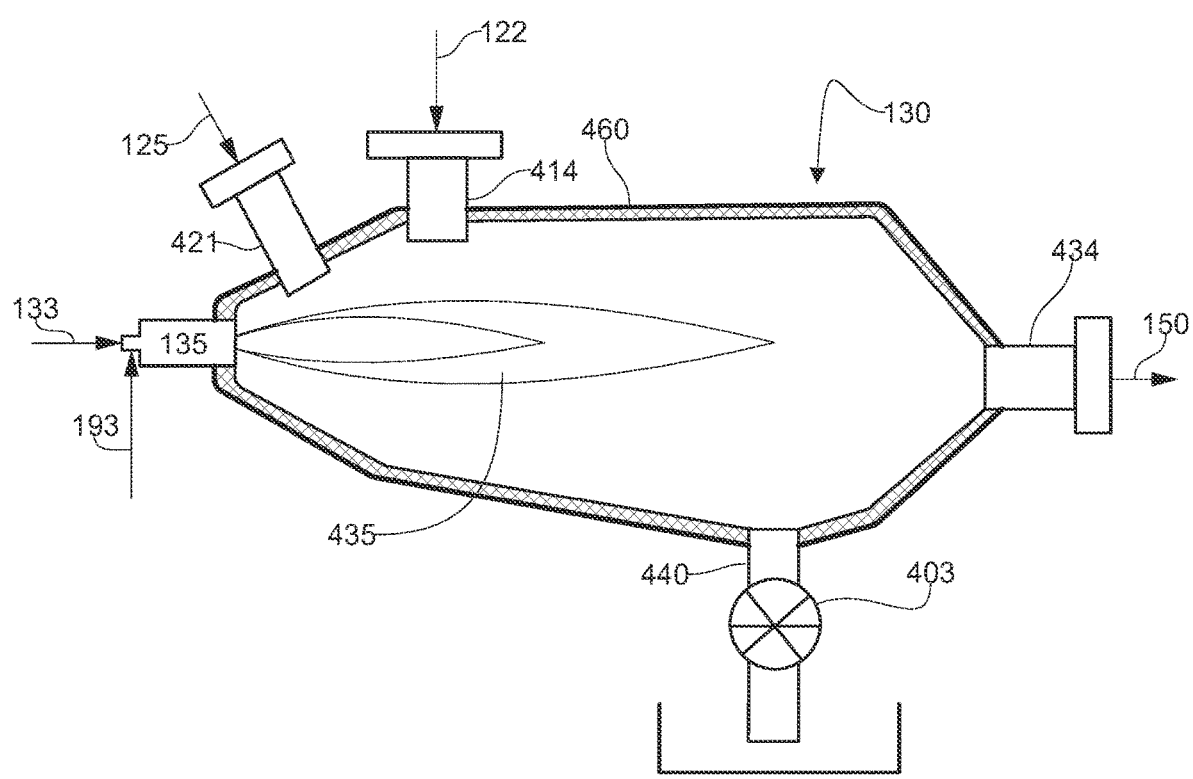
FIG. 4 shows according to a simplified view in longitudinal cross section, an exemplary embodiment of the high temperature reformer.

FIG. 4 According to an exemplary embodiment, the high temperature reformer (130) is set horizontally and comprises an external shell (460), an insulation layer (461) and a ceramic internal lining. Steam-enriched thermogas issued from the expansion reactor enters the high temperature reformer at one end through a thermogas inlet (421) and chars are conveyed by a char conveyor (122) to a char inlet (414). The steam-enriched thermogas entering the high temperature reformer through the second duct line (125) is enriched in steam through the steam injection performed in the expansion reactor.

The oxy-fuel burner (135) is supplied with the off-gas (193) produced either as a byproduct of the hydrogen separation unit comprising $H_2$ and CO, or, according to a preferred embodiment, as a portion of $H_2$ produced by the hydrogen separation unit that is collected and ducted accordingly. The oxy-fuel burner is supplied with industrial grade oxygen, therefore the combustion does not involve air and the potential creation of NOx.

The combustion makes a high temperature flame (435) inside the reformer, raising the temperature therein up to 1,400° C.

The raw reformed gas (150) leaves the high temperature reformer through a reformed gas outlet (434) and solid residues are collected at the bottom of the reformer through an ash hatch (440) comprising a rotary valve airlock (403). The ashes are further disposed off-site.

As shown above, raw reformed gas (150) at high temperature is directed to a particle cleaning station before being conditioned and send to the hydrogen separation unit, and for one part of it, first goes through the heat chamber of the screw thermolyzer before going through the reformed gas conditioning unit.

FIG. 5 according to a preferred embodiment the conditioned reformed gas (251) rich in $H_2$ exiting de reformed gas conditioning unit (170), but comprising also CO, $CO_2$ and $N_2$ first enters a CO conversion Water Gas Shift Reactor (591, WGSR).

The WGSR contains catalyzing media and uses steam injected from the steam line (113) to cause the carbon monoxide in the reformed gas to react and to form hydrogen and carbon dioxide. The WGSR (591) removes 100% of the carbon monoxide and significantly increases the hydrogen content in the reformed gas.

Exiting the WGSR (591) the WGSR processed gas (595) comprising $CO_2$, $H_2$ and $N_2$ is filtered through a filtering and compression unit (592) comprising an ultrafine filter and a screw compressor adapted to compress the reformed gas to a pressure of 20 to 30 bars before entering a Vacuum Pressure Swing Absorption CO2 separator (593).

The VPSA separates 100% of the carbon dioxide leaving only hydrogen and nitrogen in the VPSA processed gas (551) that enters the Pressure Swing Absorption device (590) that separates $H_2$.

The $CO_2$ (194) is directed to the carbon capture and sequestration unit (180) where carbon is processed and stored as a solid medium and other gasses, comprising mostly hydrogen are used to supply the oxy-fuel burner.

The PSA device (590) produces hydrogen with a purity which meets ISO 14687 Grade D specs for use in PEM Fuel Cells.

The hydrogen is stored in a storage (192) for instance in a pressure tank, while part of it is collected and sent as "off-gas" (193), actually $H_2$, to supply the oxy-fuel burner.

Therefore, considering the system as a whole according to this preferred embodiment, the only gaseous air discharge consists of steam and nitrogen.

Figure 6:
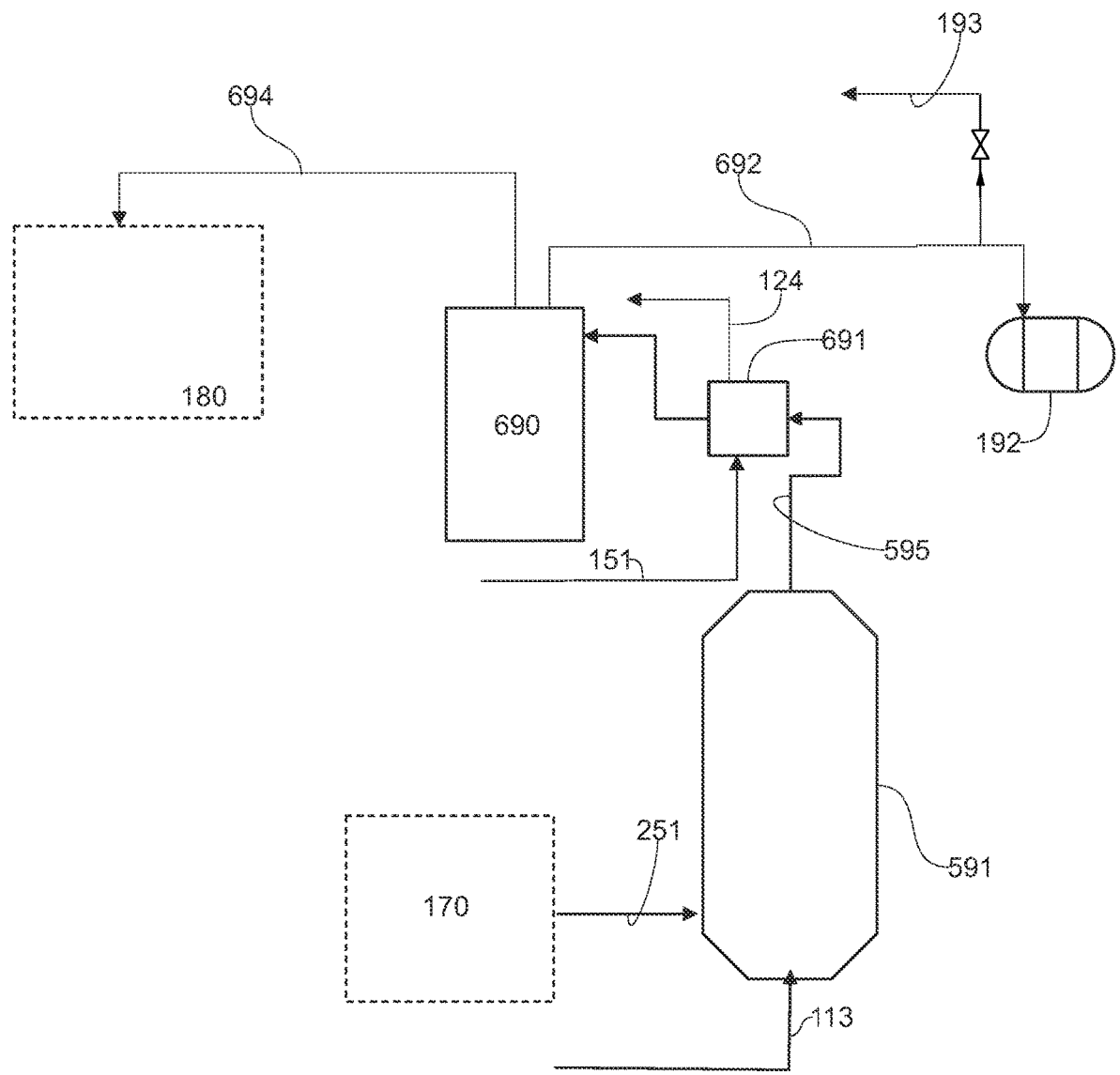
FIG. 6 shows a variant of the installation of FIG. 5 wherein the hydrogen separation is performed by a membrane reactor.

FIG. 6 according to an alternate embodiment the hydrogen separation is performed through a membrane reactor (690) for instance through a palladium membrane reactor.

According to this embodiment the WGSR processed gas (595), is directed first through a heat exchanger (691) where it is heated to a temperature high enough to react in the membrane reactor (690).

According to an exemplary embodiment the heating is provided through heat exchange with the clean reformed gas (151) coming from the high temperature reformer, this gas is further directed to the heating duct line (124) to heat up the heating chamber of the screw thermolyzer.

The membrane reactor (690) separates the WGSR processed gas (595) into a $CO_2$ rich stream (694) that is directed to the carbon capture and sequestration unit and to Fuel Cell grade $H_2$ (692) that is directed to a storage (192), part of it (193) being used to supply the oxy-fuel burner.

The latter embodiment is less investment intensive than the embodiment depicted in FIG. 5 and also allows a production increase of $H_2$ by 50%.

EXAMPLES

Example 1

The following table shows a nonlimiting example of the material flows through the installation according to a first embodiment wherein the oxy-fuel burner is supplied with an off-gas comprising mostly CO and $H_2$.

Although the system is capable of transforming a mix of chemically organic feedstock like municipal waste, the feedstock considered in this example is wooden chips.

Once a steady state is reached the system produces about 39 kg of hydrogen per hour thus a potential energy of 1.3 MW·h per hour while being self-sustainable.

Part of this produced hydrogen may be used in a fuel cell to produce the electricity required for the system, e.g. for the drives of the screw thermolyzer.

Example 2

In this second example the oxy-fuel burner is supplied with $H_2$ issued from the Pressure Swing Absorption device.

The feedstock is wooden chips the major constituents of which, with regard to the process, are given in [Table. 2].

TABLE 2

| Constituents | Weight % | Kg/h |
|---|---|---|
| Carbon | 46.00% | 506.00 |
| Hydrogen | 6.00% | 66.00 |
| Chlorine | 0.50% | 5.50 |
| Oxygen | 25.00% | 275.00 |
| Nitrogen | 1.00% | 11.00 |
| Sulfur | 0.50% | 5.50 |
| H2O | 6.44% | 70.84 |
| Metal | 0.00% | 0.00 |
| Inorganics/ashes | 14.56% | 160.16 |
| Totals | 100.00% | 1,100.00 |

The steam is injected at a pressure of 10 Bar gauge and a temperature of 175° C. in the steam line (113) for supplying the devices using steam, e.g. the expansion reactor (120), the high temperature reformer (130) and the WGSR (591).

TABLE 1

| Material input | Flow rate [Kg/hour] | Stage | Material output | Flow rate [Kg/hour] |
|---|---|---|---|---|
| Organic feedstock | 421 | Thermnolyzer (110) | Thermogas (121) | 517.26 |
| Steam | 155.87 | | Ash (105)/chars (122) | 61.30 |
| Thermogas (121) | 517.26 | High temperature reformer (130) | Raw reformed gas (150) | 718.81 |
| Ash/Char | 61.30 | | Ash/Char | 61.30 |
| Steam | 98.82 | | | |
| Off-gas (193) | 11.64 | | | |
| Oxygen (133) | 92.62 | | | |
| Clean Reformed gas (151) | 718.81 | Gas conditioning unit (170) | Conditioned reformed gas (251) | 564.71 |
| Process water | 150 | | steam (113) | 527.35 |
| | | | blowdown | 32 |
| | | | Salts/acid | 48 |
| Conditioned Reformed gas (251) | 564.71 | Carbon capture | Conditioned Reformed gas | 409.59 |
| | | | Captured Co2 | 155.12 |
| Conditioned Reformed gas (251) | 409.59 | Hydrogen separation (190) | Off-gas (193) | 353.88 |
| | | | Pure H2 | 38.58 |
| | | | impurities | 17.13 |

[Table 3] gives the overall main streams between the different stations of the installation.

TABLE 3

| Material input | Flow rate [Kg/hour] | Stage | Material output | Flow rate [Kg/hour] |
|---|---|---|---|---|
| Organic feedstock | 1,100 | Thermolyzer (110) | Thermogas (121) | 1,351.52 |
| Steam | 407 | | ashes (122) | 160.16 |
| Thermogas (121) | 1,351.52 | High temperature reformer (130) | Raw reformed gas (150) | 1,646.15 |
| Steam | 97.35 | | | |
| Clean reformed gas (151) | 1,646.15 | Gas conditioning unit (170) | Conditioned reformed gas (251) | 1,474.34 |
| Process water | 475 | | steam (113) | 1217.03 |
| Conditioned Reformed gas (251) | 1,474.34 | WGSR (591) | WGSR processed gas (595) | 2067.86 |
| Steam (113) | 593.19 | | | |
| WGSR processed gas (595) | 2067.86 | $CO_2$ VPSA (593) | VPSA Processed gas (551) | 132.26 |
| | | | $CO_2$ | 1,855.33 |
| | | | $H_2$ | 80.27 |
| VPSA processed gas (551) | 132.26 | Hydrogen separator PSA (590) | H2 Sep rejected Gas | 40.76 |
| | | | $H_2$ | 91.50 |
| $CO_2$ | 1,855.33 | Carbon Capture (180) | Carbonates | 4,216.67 |
| $H_2$ | 80.27 | | $H_2$ | 80.27 |
| $Ca(OH)_2$ | 3120.33 | | Water produced | 758.66 |

As a whole, in such a configuration, the system produces 69 Kg/h of ISO 14687 Grade D hydrogen along with 102 Kg/h of hydrogen mixed with traces of $CO_2$ and $N_2$ that can be either used for burning or directed to a second PSA device to further extract fuel cell grade $H_2$.

According to the above example 22.48 Kg/h of PSA quality $H_2$ is used to supply the oxy-fuel burner.

The thermogas composition is given in [Table 4]

TABLE 4

| Constituents | Weight % |
|---|---|
| Carbon monoxide | 38% |
| Carbon dioxide | 30% |
| Hydrogen | 7% |
| Tar | 11% |
| Nitrogen | 1% |
| HCl | <1% |
| $H_2S$ | <1% |
| $H_2O$ | 9% |
| Methane | 5% |

The reformed gas composition at the exit of the high temperature reformer is given in [Table. 5]

TABLE 5

| Constituents | Weight % |
|---|---|
| Carbon monoxide | 56% |
| Carbon dioxide | 25% |
| Hydrogen | 8% |
| Tar | 0% |
| Nitrogen | 1% |
| HCl | <1% |
| $H_2S$ | <1% |
| $H_2O$ | 10% |
| Methane | 0% |

The composition of the WGSR processed gas is given in [Table 6]. Note that the gas entering the WGSR units went prior through the gas conditioning unit (170).

TABLE 6

| Constituents | Weight % |
|---|---|
| Carbon monoxide | 0% |
| Carbon dioxide | 90% |
| Hydrogen | 10% |
| Tar | 0% |
| Nitrogen | 1% |
| HCl | <0.1% |
| $H_2S$ | <0.1% |
| $H_2O$ | 0% |
| Methane | 0% |

The composition of the CO2 VPSA processed gas is given in [Table. 7]

TABLE 7

| Constituents | Weight % |
|---|---|
| Carbon monoxide | 0% |
| Carbon dioxide | 0% |
| Hydrogen | 91% |
| Tar | 0% |
| Nitrogen | 8% |
| HCl | <0.1% |
| $H_2S$ | <0.1% |
| $H_2O$ | 1% |
| Methane | 0% |

The invention claimed is:

1. A system for extracting hydrogen from an organic feedstock, comprising:
an organic waste feeder unit configured to supply organic feedstock,
a screw thermolyzer comprising a feedstock inlet connected to the organic waste feeder unit at a first end, a solid residues outlet at a second end, a gasification chamber comprising an auger, and a thermogas collector, adapted to heat up the organic feedstock to a temperature of at least 800° C. while conveying the organic feedstock inside the gasification chamber by the auger from the first end to the solid residues outlet at the second end, and to collect a thermogas at the thermogas collector, a first duct line adapted to convey the thermogas from the thermogas collector to a thermogas inlet of a high temperature reformer, the high temperature reformer configured to expose the thermogas to a temperature between 1,200° C. and 1,400° C. and release a reformed gas through a reformed gas outlet, a reformed gas duct line adapted to convey the reformed gas from the reformed gas outlet to a reformed gas inlet of a heat chamber of the screw thermolyzer, the heat chamber being comprised between an enclosure of the gasification chamber and an outside enclosure of the screw thermolyzer and comprising a chamber outlet to release the reformed gas after circulation in the heat chamber from the reformed gas inlet to the chamber outlet, a third duct line adapted to convey the reformed gas from the chamber outlet to an installation adapted to separate hydrogen from the reformed gas, and a hydrogen storage connected to the installation for the hydrogen produced by the installation.

2. The system of claim 1, further comprising a char conveyor adapted to convey chars collected at the solid residues outlet of the screw thermolyzer to a char inlet of the high temperature reformer.

3. The system of claim 1, wherein the screw thermolyzer comprises two parallel augers adapted to convey the organic feedstock in opposite directions from the first end to the second end.

4. The system of claim 1, wherein the screw thermolyzer comprises a steam injection inlet adapted to inject steam into the gasification chamber.

5. The system of claim 1, wherein the installation adapted to separate hydrogen from the reformed gas comprises a carbon capture and sequestration unit.

6. The system of claim 5, wherein the carbon capture and sequestration unit comprises a mineralization of carbon dioxide in a brine solution and comprises a production of carbonates ($CO_3^{2-}$).

7. The system of claim 6, wherein the high temperature reformer comprises an oxy-fuel burner adapted to raise the temperature of the thermogas conveyed into the high temperature reformer.

8. The system of claim 7, wherein the oxy-fuel burner is adapted to receive an off-gas issued from the installation adapted to separate hydrogen from the reformed gas.

9. The system of claim 8, wherein the installation adapted to separate hydrogen from the reformed gas comprises the production of N5 pure hydrogen ($H_2$) and the off-gas comprises, in volume, at least 60% of carbon monoxide (CO) and at least 15% hydrogen.

10. The system of claim 8, wherein the installation adapted to separate hydrogen is adapted to direct the reformed gas to a CO conversion Water Gas Shift Reactor to make a WGSR processed gas.

11. The system of claim 10, further comprising a Vacuum Pressure Swing Absorption CO2 separator adapted to receive the WGSR processed gas before a Pressure Swing Absorption device, and wherein the off-gas supplying the oxy-fuel burner is hydrogen.

12. The system of claim 10, further comprising a membrane reactor adapted for hydrogen separation and wherein the WGSR processed gas is heated through heat exchange with reformed gas issued from the high temperature reformer before entering the membrane reactor.

13. The system of claim 1, wherein the first duct line comprises an expansion reactor between the thermogas collector and the thermogas inlet.

14. The system of claim 13, wherein the expansion reactor comprises a reactor steam inlet adapted to inject steam in the thermogas in the expansion reactor.

15. The system of claim 13, wherein the expansion reactor comprises a mixing chamber configured to promote mixing of the thermogas with steam by a turbulent flow through the mixing chamber.

16. The system of claim 14, further comprising a gas conditioning unit adapted to cool the reformed gas before entering the installation adapted to separate hydrogen from the reformed gas, and wherein such cooling is performed through a heat exchanger with water.

17. The system of claim 15, further comprising the heat exchanger, wherein the water flowing through the heat exchanger exchanges heat with the reformed gas to make steam.

18. The system of claim 16, further comprising a boiler with a burner adapted to further raise a temperature of the water flowing through the heat exchanger and wherein the burner is supplied with reformed gas.

19. The system of claim 18, further comprising a CO conversion Water Gas Shift Reactor, wherein in the installation adapted to separate hydrogen, the reformed gas is directed to the CO conversion Water Gas Shift Reactor to make a WGSR processed gas, and wherein the steam is injected into the WGSR.

20. The system of claim 16, further comprising a means by which the steam is injected to the gasification chamber and the expansion reactor.

* * * * *